US011138564B2

(12) United States Patent
Costenaro et al.

(10) Patent No.: US 11,138,564 B2
(45) Date of Patent: *Oct. 5, 2021

(54) SETTING PERMISSIONS FOR LINKS FORWARDED IN ELECTRONIC MESSAGES (71) Applicant: MICROSOFT TECHNOLOGY LICENSING, LLC, Redmond, WA (US)

(72) Inventors: Daniel Paul Costenaro, Bellevue, WA (US); Jedidiah Brown, Seattle, WA (US); David Paul Limont, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/238,456

(22) Filed: Jan. 2, 2019

(65) Prior Publication Data
US 2019/0138998 A1 May 9, 2019

Related U.S. Application Data (63) Continuation of application No. 13/102,875, filed on May 6, 2011, now Pat. No. 10,185,932.

(51) Int. Cl.
G06Q 10/10 (2012.01)
H04L 12/58 (2006.01)
G06F 21/62 (2013.01)

(52) U.S. Cl.
CPC ....... G06Q 10/107 (2013.01); G06F 21/6218 (2013.01); H04L 51/08 (2013.01);
(Continued)

(58) Field of Classification Search
CPC ......... H04L 51/24; H04L 51/08; H04L 51/18; H04L 51/00; G06Q 10/107; G06F 21/6218
See application file for complete search history.

(56) References Cited

U.S. PATENT DOCUMENTS 6,275,848 B1 8/2001 Arnold
6,401,093 B1 6/2002 Anand et al.
(Continued)

FOREIGN PATENT DOCUMENTS

KR 20110003490 U 4/2011

OTHER PUBLICATIONS

"Non Final Office Action Issued in U.S. Appl. No. 13/096,899", dated Jul. 12, 2019, 23 Pages.
(Continued)

Primary Examiner — Nam T Tran
(74) Attorney, Agent, or Firm — Merchant & Gould P.C.

(57) ABSTRACT

A permission manager detects when the message including the link is forwarded and sends a notification to the author indicating that the message was forwarded to another recipient. A notification may also be sent to the recipient who received the forwarded message indicating that the author has been notified that the recipient is not authorized to access the linked content within the forwarded message. The author may set the permissions for accessing the linked content from permission options that are displayed with the notification message sent by the permission manager. Once the permissions are set, the permission manager may send a notification to the recipient of the forwarded message with information relating to the set permissions.

20 Claims, 7 Drawing Sheets (52) U.S. Cl.
CPC .............. *H04L 51/18* (2013.01); *H04L 51/24* (2013.01); *H04L 51/00* (2013.01)

(56) References Cited

U.S. PATENT DOCUMENTS

| | | | |
|---|---|---|---|
| 7,783,711 B2* | 8/2010 | LeVasseur | G06Q 10/107 709/206 |
| 2004/0158586 A1 | 8/2004 | Tsai et al. | |
| 2005/0289221 A1* | 12/2005 | Steele | H04L 63/20 709/206 |
| 2007/0198657 A1 | 8/2007 | Saliba et al. | |
| 2011/0099380 A1* | 4/2011 | Vandewater | H04L 63/102 713/176 |
| 2011/0161430 A1 | 6/2011 | Callanan et al. | |

OTHER PUBLICATIONS

"Office Action Issued in Korean Patent Application No. 10-2013-7028223", dated Dec. 24, 2018, 5 Pages.

"Final Office Action Issued in Korean Patent Application No. 10-2013-7028277", dated Nov. 19, 2018, 6 Pages.

"Final Office Action Issued in U.S. Appl. No. 13/096,899", dated Dec. 5, 2018, 18 Pages.

"Office Action Issued in Korean Patent Application No. 10-2013-7028277", dated Jan. 21, 2019, 6 Pages.

"Oral Hearing Issued in European Patent Application No. 12777397.6", dated Jan. 16, 2019, 8 Pages.

"Notice of Allowance Issued in Korean Patent Application No. 10-2013-7028223", dated May 29, 2019, 3 Pages.

"Summons to Attend Oral Proceedings Issued in European Patent Application No. 12776501.4", dated Dec. 13, 2018, 10 Pages.

"Final Office Action Issued in U.S. Appl. No. 13/096,899", dated Jan. 3, 2020, 36 Pages.

"Office Action Issued in Indian Patent Application No. 8458/CHENP/2013", dated Oct. 30, 2019, 8 Pages.

"Non Final Office Action Issued in U.S. Appl. No. 13/096,899", dated Aug. 13, 2020, 29 Pages.

"Non Final Office Action Issued in U.S. Appl. No. 13/096,899", dated Apr. 19, 2021, 22 Pages.

"First Office Action and Search Report Issued in Chinese Patent Application No. 201810697272.X", dated Jun. 3, 2021, 13 Pages.

* cited by examiner

SETTING PERMISSIONS FOR LINKS FORWARDED IN ELECTRONIC MESSAGES

CROSS-REFERENCE

The present application is a continuation of and claims priority to U.S. patent application Ser. No. 13/102,875, filed May 6, 2011, entitled SETTING PERMISSIONS FOR LINKS FORWARDED IN ELECTRONIC MESSAGES, and now U.S. Pat. No. 10,185,932, the disclosure of which is hereby incorporated in its entirety by reference.

BACKGROUND

Users routinely send links to documents and other content to users for viewing. A user receiving the message finds the link within the message and then uses the link to access the content. A user may forward the message containing the link to other users that may not be authorized to access the linked content.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A permission manager detects when an electronic message including one or more links is forwarded to another recipient. For example, an author may send a message that has permissions set that allow access to the linked content for the recipient, that is then forwarded by the recipient to another recipient. The permission manager detects when the message including the link is forwarded and sends a notification to the author indicating that the message was forwarded to another recipient. A notification may also be sent to the recipient who received the forwarded message indicating that the author has been notified that the recipient is not authorized to access the linked content within the forwarded message. The author may set the permissions for accessing the linked content from permission options that are displayed with the notification message sent by the permission manager. Once the permissions are set, the permission manager may send a notification to the recipient of the forwarded message with information relating to the set permissions.

DETAILED DESCRIPTION

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Figure 1:
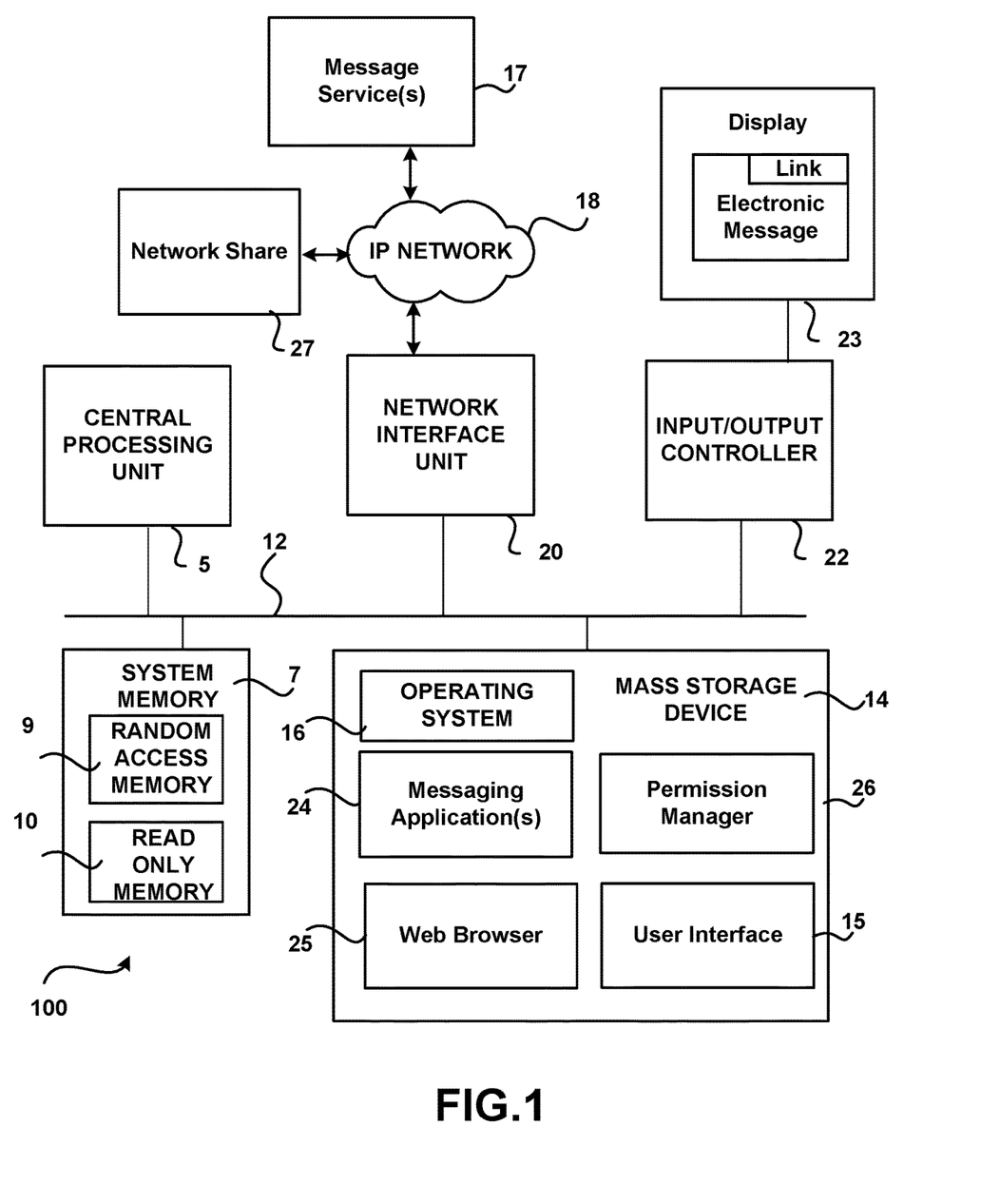
FIG. 1 illustrates an exemplary computing environment.

Referring now to FIG. 1, an illustrative computer environment for a computer 100 utilized in the various embodiments will be described. The computer environment shown in FIG. 1 includes computing devices that each may be configured as a mobile computing device (e.g. phone, tablet, net book, laptop), server, a desktop, or some other type of computing device and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, messaging application(s) 24, Web Browser 25, and permission manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

Computer 100 operates in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide input/output to a display screen 23, a printer, or other type of output device.

As mentioned briefly above, a number of program modules and data files may be stored in the mass storage device 14 and RAM 9 of the computer 100, including an operating system 16 suitable for controlling the operation of a computer, such as the WINDOWS PHONE 7®, WINDOWS 7®, or WINDOWS SERVER® operating system from MICROSOFT CORPORATION of Redmond, Wash. The mass storage device 14 and RAM 9 may also store one or more program modules. In particular, the mass storage device 14 and the RAM 9 may store one or more application programs, including one or more messaging application(s) 24 and Web browser 25.

A user interface 15 is used by a user to interact with applications and documents. Messaging application(s) 24 may be one or more different messaging applications. For example, computer 100 may include an email application, an Instant Messaging (IM) application, an SMS, MMS application, a real-time information network (e.g. Twitter® interface), a social networking application, and the like. According to an embodiment, messaging application 24 is an email application, such as MICROSOFT OUTLOOK®. The messaging application(s) may be client based and/or web based. For example, a network based message service 17 may be used, such as: MICROSOFT WINDOWS LIVE or some other network based email and messaging service.

Network share 27 is configured to store content (e.g. documents, spreadsheet, Web content, and the like) that are accessible to one or more users through IP network 18. For example, network share 27 may store content that is accessible by users located at one or more locations. Links that are included within electronic messages may access content within network share 27 when the link is used.

Permission manager 26 is configured to set permissions for a link that is forwarded in an electronic message. Permission manager 26 may be located externally from an application, e.g. messaging application 24, as shown or may be a part of an application. Further, all/some of the functionality provided by permission manager 26 may be located internally/externally from a messaging application.

Permission manager 26 is configured to detect when an electronic message including one or more links is forwarded to a recipient that is not an original recipient of the message. The term "link" refers to an address that represents a location of content. For example, a link may be in the form of a Uniform Resource Locator (URL) that specifies a network location of where the content is stored. Selecting the link generally retrieves the content that is pointed to by the link. An author may send a message to a recipient that has permissions allowing the recipient to access to the linked content. The recipient of the original message may forward the message to another recipient that may/may not be authorized to access the linked content. Permission manager 26 detects when the message including the link is forwarded and sends a notification to the author indicating that the message was forwarded to another recipient. A notification may also be sent to the recipient who received the forwarded message from permission manager 26 indicating that the author has been notified that the recipient is not authorized to access the linked content within the forwarded message. The author may set the permissions for the recipients receiving the forwarded message by accessing permission options that are displayed with the notification message that was sent from permission manager 26. Once the permissions are set, permission manager 26 may send a notification to the recipient of the forwarded message with information relating to the set permissions. More details regarding the permission manager are disclosed below.

Figure 2:
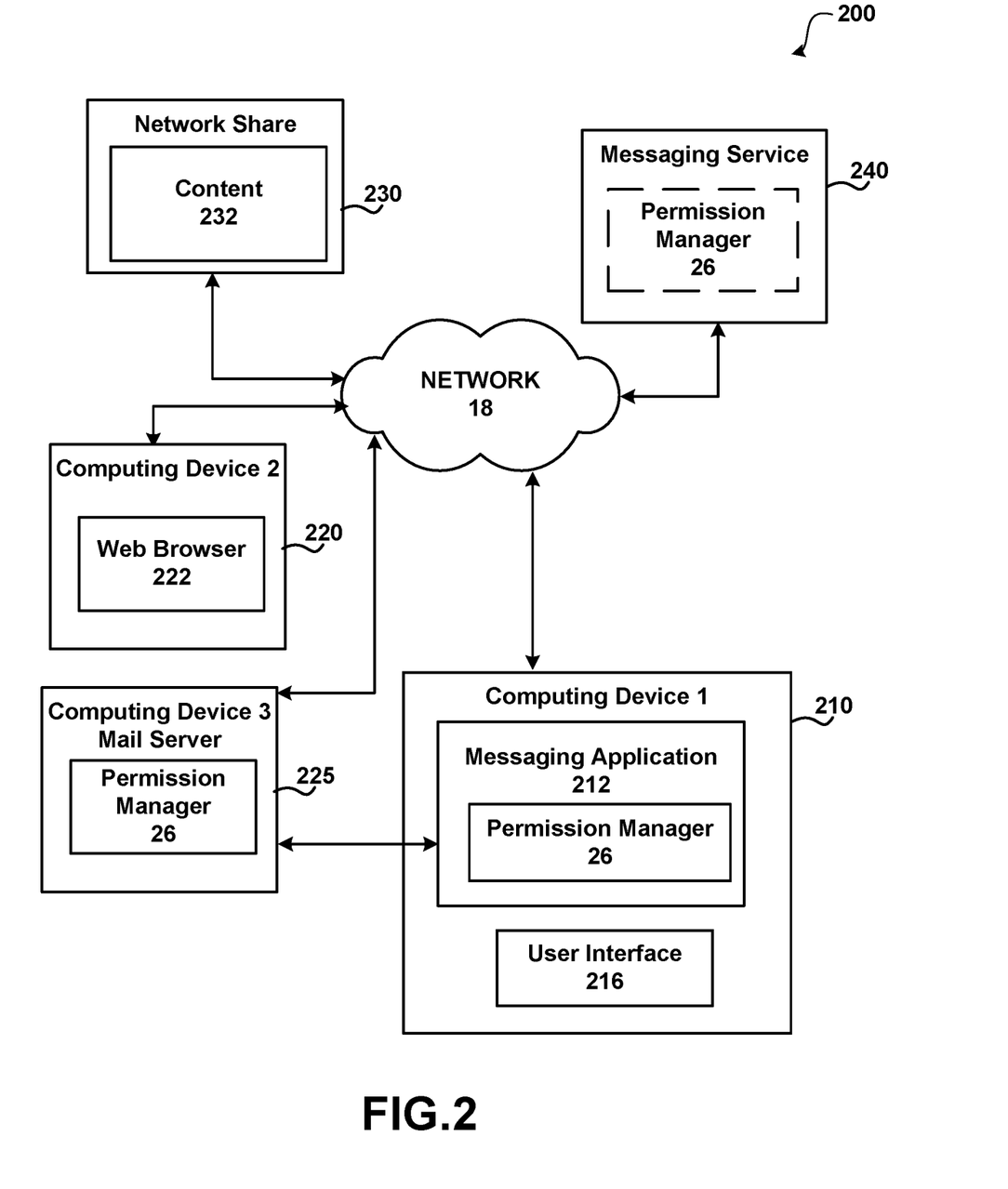
FIG. 2 shows a system for setting permissions for links that are forwarded in electronic messages.

FIG. 2 shows a system for setting permissions for links that are forwarded in electronic messages. As illustrated, system 200 includes computing device 1 (210), computing device 2 (220), computing device 3 (225), network share 230 and messaging service 240.

The computing devices may be any type of computing device that is configured to perform the operations relating to sending and receiving electronic messages that include links to content. For example, some of the computing devices may be: mobile computing devices (e.g. cellular phones, tablets, smart phones, laptops, and the like); desktop computing devices and servers. Some computing devices may be arranged to provide an online service (e.g. messaging service 240 that is configured for sending and receiving electronic messages), some may be arranged as data shares, some may be arranged in local networks, some may be arranged in networks accessible through the Internet, and the like.

The computing devices are coupled through network 18. Network 18 may be many different types of networks. For example, network 18 may be an IP network, a carrier network for cellular communications, and the like. Generally, network 18 is used to transmit data between computing devices, such as computing device 1, computing device 2, computing device 3, network share 230 and messaging service 240.

Computing device 1 includes messaging application 212 and user interface 216. As illustrated, computing device 1 is used by a user to interact with electronic messages, content in a network share (e.g. content 232) and the like.

User interface (UI) 216 is used to interact with an application and content, such as messaging application 212 and content 232. One or more user interfaces of one or more types may be used to interact with the content. For example, UI 216 may include the use of a context menu, a menu within a menu bar, a menu item selected from a ribbon user interface, a graphical menu, and the like. Generally, UI 216 is configured such that a user may easily interact with content and electronic messages. For example, a user may simply select an option within UI 216 that creates new electronic messages that include one or more links to content.

Messaging application 212 may be a client based application, such as an email application, an Instant Messaging Application, a social media application, and the like. Generally, messaging application 212 is used to send and receive electronic messages of one or more types. A network based messaging service 240 may be used in addition to messaging application 212 or instead of one or more of the different messaging applications. For example, a web interface may be used to access messaging service 240.

Messaging service 240 may be used to process electronic messages between one or more computing devices, such as computing device 1 and computing device 2. Messaging service 240 may be configured to process different message types, such as SMS, MMS, email, messages for social networks and the like. Messaging service 240 may be configured with the functionality of permission manager 26 and one or more message types may be used to communicate the electronic messages including links to content.

Computing device 2 includes one or more applications, such as a web browser (222) that may be configured to access a messaging service, such as a web based email service and to interact with content. For example, a web browser may be used to access an electronic message through an email service and then access content 232 stored in network share 230.

One or more network shares (e.g. Network share 230) may be used to store content. The content may be any type of content that is linked within a message, such as word processing documents, spreadsheets, slides, website content and the like. Network share 230 is accessible by the computing devices that interact with the content. The network share may be associated with an online service that supports online access/interaction with content.

Computing device 3 (225) is configured as a mail server. For example, messaging application 212 on computing device 1 may be used to create a message that includes a link that is to be sent to one or more recipients. When the user sends the message, computing device 3 may be configured to perform various mail processing actions and to deliver the message to the one or more recipients. As illustrated, computing device 3 includes functionality of permission manager 26. According to an embodiment, computing device 3 (mail server) using permission manager 26 determines when a message including a link is forwarded to another recipient.

Permission manager 26 is configured to detect any links to content that are included within an electronic message that is forwarded. The links may be to any type of content, such as word processing documents, spreadsheets, slides, website content and the like. Generally, the link may be to any type of content that is accessible by a computing device. Permission manager 26 is configured to detect when an electronic message including one or more links is forwarded to a recipient that is not an original recipient of the message. Permission managers on different computing devices and/or networks may be configured to communicate information between them. For example, permission manager 26 on computing device 3 may communicate to the permission manager on messaging service 240 to provide/obtain information about sent/forwarded messages that includes links. The permission manager may store permission settings for links within a central data store, such as network share 230.

Permission manager 26 detects when the message including the link is forwarded and sends a notification to the author indicating that the message was forwarded to another recipient. Permission manager 26 may also be configured to determine when the link is sent as an attachment that was included in the message sent by the author. A notification may also be sent to the recipient who received the forwarded message from permission manager 26 indicating that the author has been notified that the recipient is not authorized to access the linked content within the forwarded message. The author may set the permissions for accessing the link from permission options that are displayed with the notification message that was sent from permission manager 26. Once the permissions are set, permission manager 26 may send a notification to the recipient of the forwarded message with information relating to the set permissions.

FIGS. 3-6 show exemplary electronic messages including linked content. FIGS. 3-6 are for exemplary purpose and are not intended to be limiting.

Figure 3:
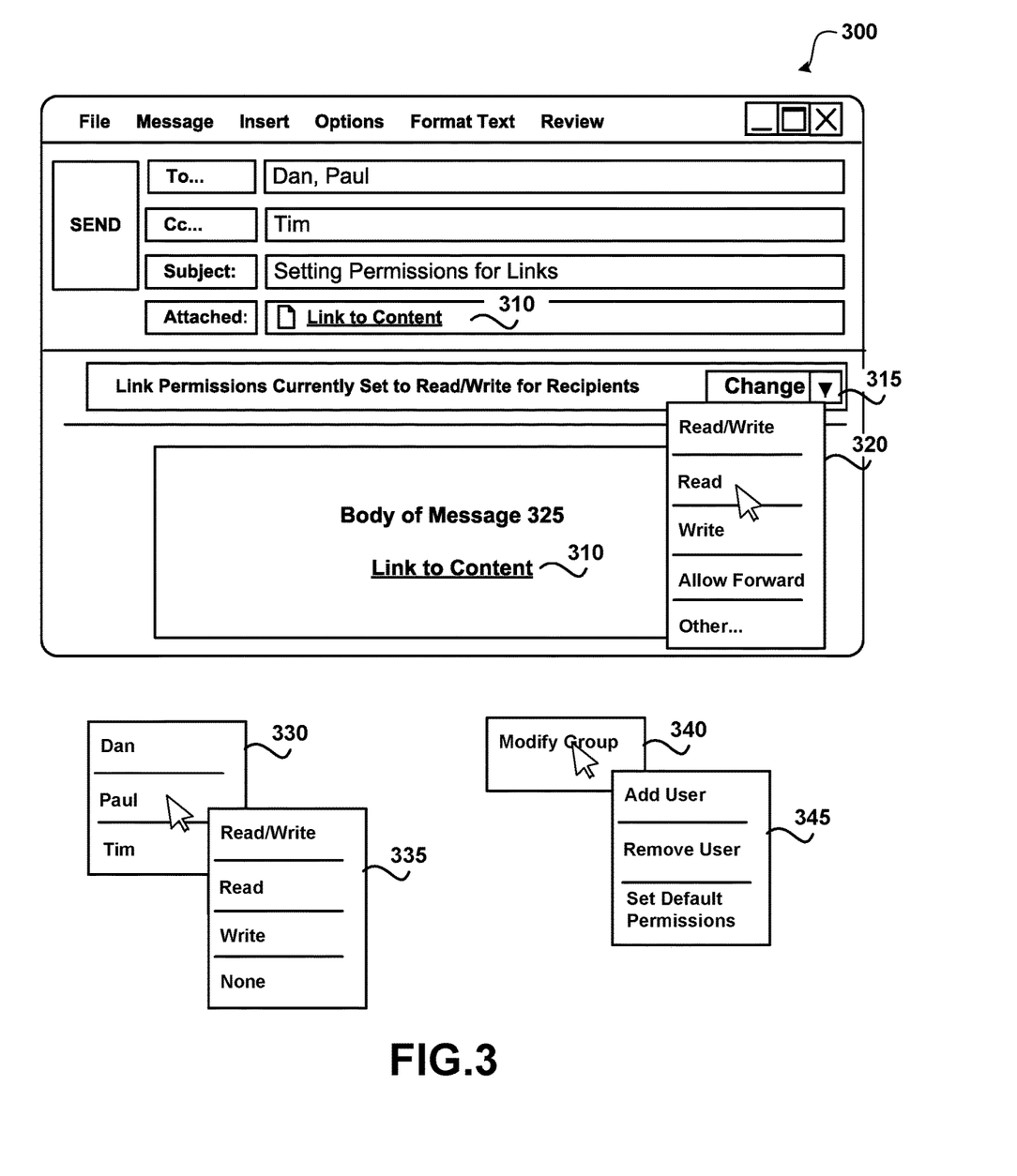
FIG. 3 shows a display of an electronic message including a link that is being composed by an author.

FIG. 3 shows a display of an electronic message including a link that is being composed by an author. As illustrated, message 300 comprises a To: field, a Cc: field, a Subject field:, an Attached field, body of the message 325 including a link to content 310, change permission options 315, 320, 330, 335, 340 and 345. More or fewer fields may be included with the electronic message.

The electronic message may be accessed and composed using one or more messaging applications. For example, a web browser may access an electronic mail service, an email application on a computing device may be configured to send/receive emails from one or more different services, and the like.

When electronic message is being composed, a link to content 310 is included with the message. The links may be to any type of content, such as word processing documents, spreadsheets, slides, websites and the like. Generally, the link may be to any type of content that is accessible by a computing device. According to an embodiment, any links to content that are included within the body of the message are displayed as linked content within an attachment area (e.g. Attached: field) such that when a user receiving the message accesses the message the linked content is viewable within an attachment area that is associated with the electronic message. In this way, the user does not have to search for the linked content within the body of the electronic message that may contain many different responses. The link that is contained within the body of the message may/may not be left within the body of the message.

A graphical indicator, such as an icon, may be displayed within the attachment area near the link. The graphical indicator may be selected to indicate a type of the content and/or other characteristics relating to the linked content. For example, a document icon may be used to show the content is a document, a web icon may be used for web content, a spreadsheet icon may be used for spreadsheets, a picture icon may be used for pictures, a message icon may be used for messages, and the like. An indicator may also be displayed that shows that the icon represents content that is linked within the body of the message. Other indicators may also be used to show other information (e.g. an indicator to show that the linked content is/is not authorized for a recipient).

Change permission option 315 provides different options for setting access permissions for the recipients of the message including link 310. For example, the author may select change permission option 315 to change the permission options for the recipients (Dan, Paul, Tim) to access the linked content that is pointed to by link 310. As illustrated, option menu 320 includes options for setting the permissions for read/write, read, write, allow forwarding, and other options. The allowed forwarding option allows the author to automatically permission recipients for forwarded messages that receive the link in a forwarded message. For example, when the allow forward option is selected, the permissions for the linked content are automatically set to allow access for each of the recipients who receive a forwarded message that includes the links from one of the original recipients.

According to an embodiment, a default set of permissions (e.g. read/write) are automatically set for any links that are included within an original message that is created by the author. Permission settings may be obtained using different menu/menu options. For example, menu 330 shows a selection for each recipient of the original message 300. Upon selection of one of the recipients from menu 330, option menu 335 is displayed that may be used to change the permissions for the selected recipient.

Menu 340 provides an option to modify the group to which the permissions apply. Selecting the modify group option 340 displays option menu 345 that allows a user to add a user from a group, remove a user from the group and set default permissions for the group. According to an embodiment, the original group is based on the recipients in the message (e.g. message 300). The author may add one or more other users to the group. For example, even though the message is only being sent to a first group of recipients, there may be other users who are on the same team that are authorized to view the linked content.

Figure 4:
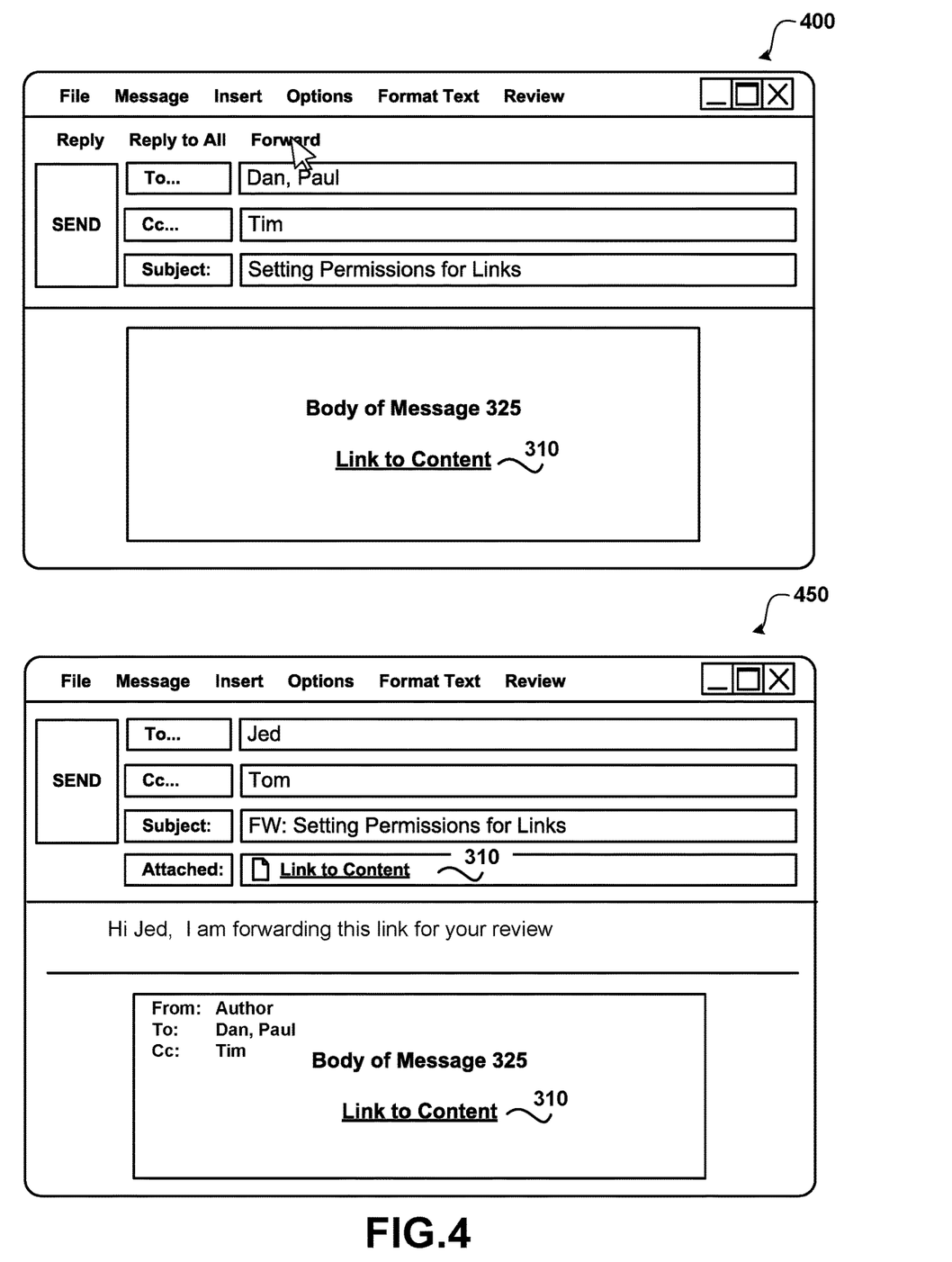
FIG. 4 shows a display of an electronic message including a link that is received by a recipient and forwarded to another recipient.

FIG. 4 shows a display of an electronic message including a link that is received by a recipient and forwarded to another recipient.

As illustrated, message 400 includes link 310 within the body of the message 400. An author creates message 400 that includes link 310 that is addressed to three recipients (Dan, Paul, Tim). A recipient of the message (e.g. Dan) determines to forward message 400 including link 310 to two additional recipients (Jed, Tom).

When message 400 is forwarded within message 450, the permission manager determines that message 400 has been forwarded to another recipient that includes a link. In response to detecting that message 400 is forwarded, the permission manager sends a notification to the author of message 400.

Figure 5:
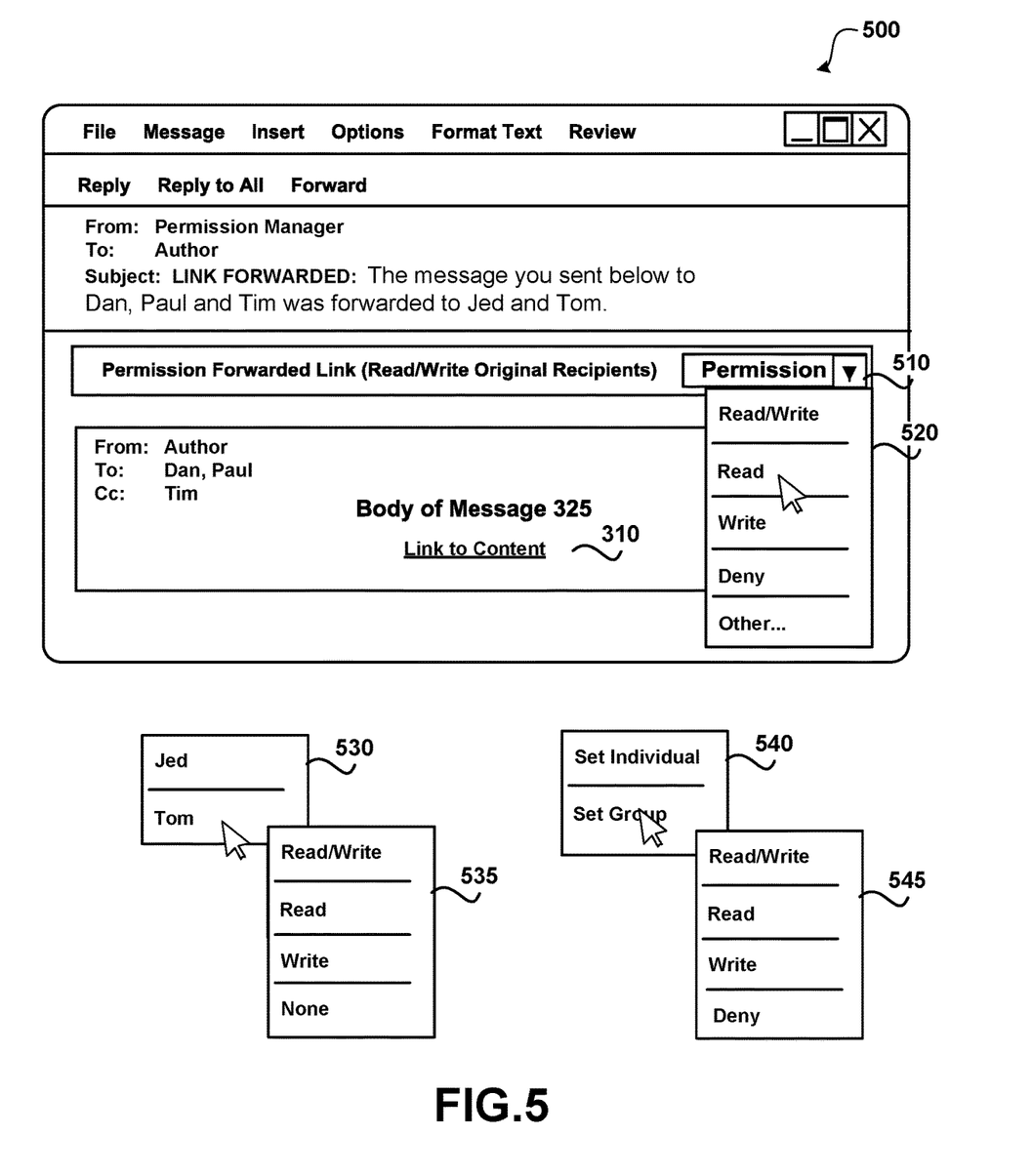
FIG. 5 shows a display of an electronic message to an author indicating that a message including a link has been forwarded to one or more additional recipients.

FIG. 5 shows a display of an electronic message to an author indicating that a message including a link has been forwarded to one or more additional recipients.

As illustrated, message 500 shows the author that a link was forwarded to another recipient. A notification message (e.g. message 500) may/may not be delivered to the author for authorized recipients of the link. For example, when a recipient of the forwarded message is already authorized to access the linked content, a notification message may not be sent to the author.

When one or more of the recipients are not authorized to access the linked content, message 500 may include permission option 510 that provides menu options for setting permissions for the recipients of the authorized message. For example, selecting permission option 510 displays options 520 that may be selected to set the permission for the link for each of the unauthorized recipients to read/write, read, write, deny access or some other option. Permission settings for the unauthorized users may be obtained using different menu/menu options.

For example, menu display 530 shows a selection for each recipient of the forwarded message 400 that is unauthorized. Upon selection of one of the recipients from menu 530, option menu 535 is displayed that may be used to change the permissions for the selected recipient.

Menu display 540 provides an option to set the permissions for each member of a group to the linked content and to set the permissions for one of the recipients. For example, when to which the permissions apply. Selecting the set group option 540 displays option menu 545 allows a user to set the permission for the group from read/write, read, write or deny.

Figure 6:
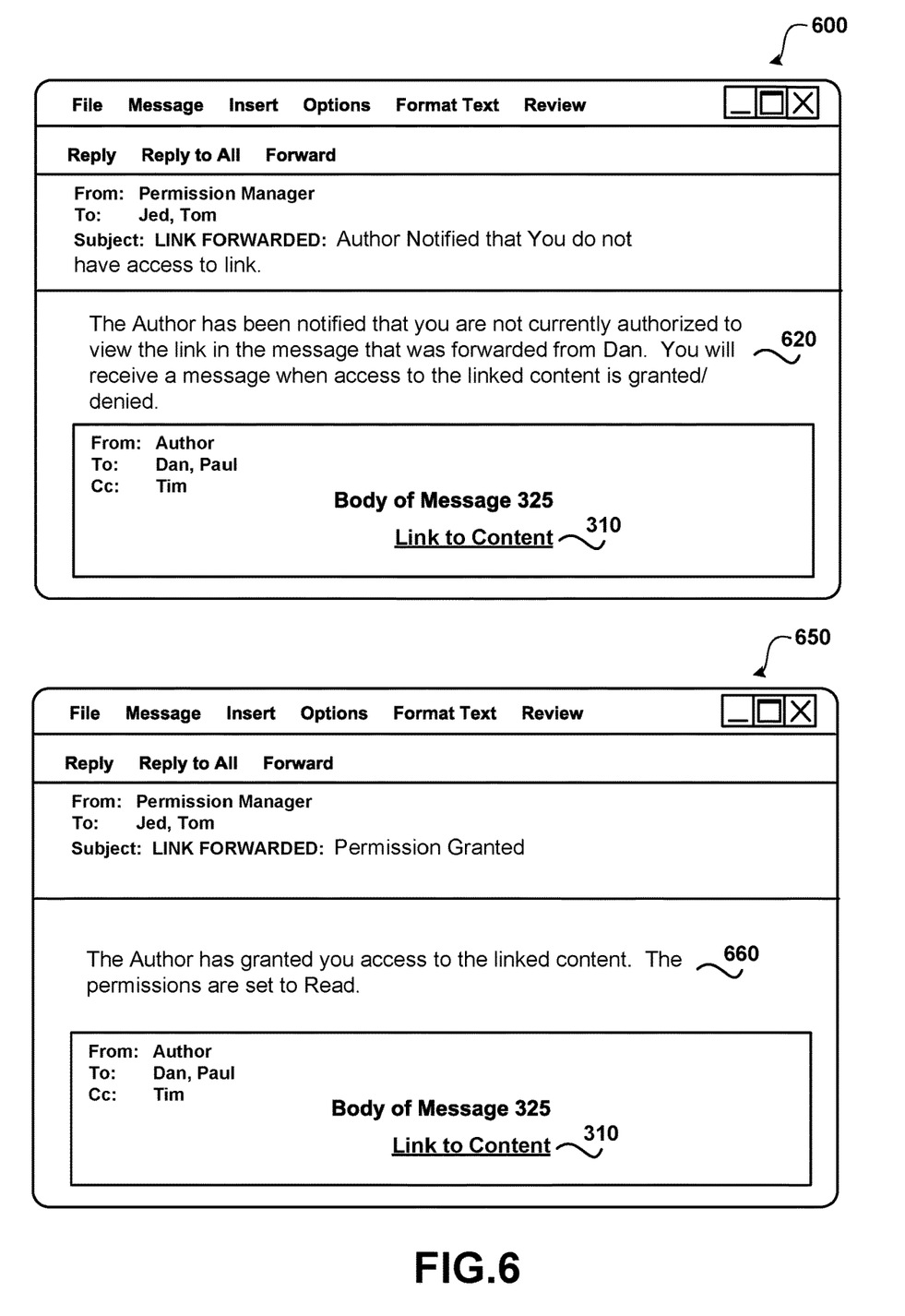
FIG. 6 shows a display of notification messages sent to recipients of a forwarded message including a link.

FIG. 6 shows a display of notification messages sent to recipients of a forwarded message including a link.

As illustrated, message 600 provides notification 620 to the unauthorized recipients that the author has been notified that the recipients do not currently have access to the link and that the author is being requested to set the permissions for each of the unauthorized recipients.

Message 650 provides a notification to a recipient of the message that permissions have been set. For example, notification 660 may provide the recipient with the permissions that were set for the recipient by the author (e.g. read permission in the current example).

Figure 7:
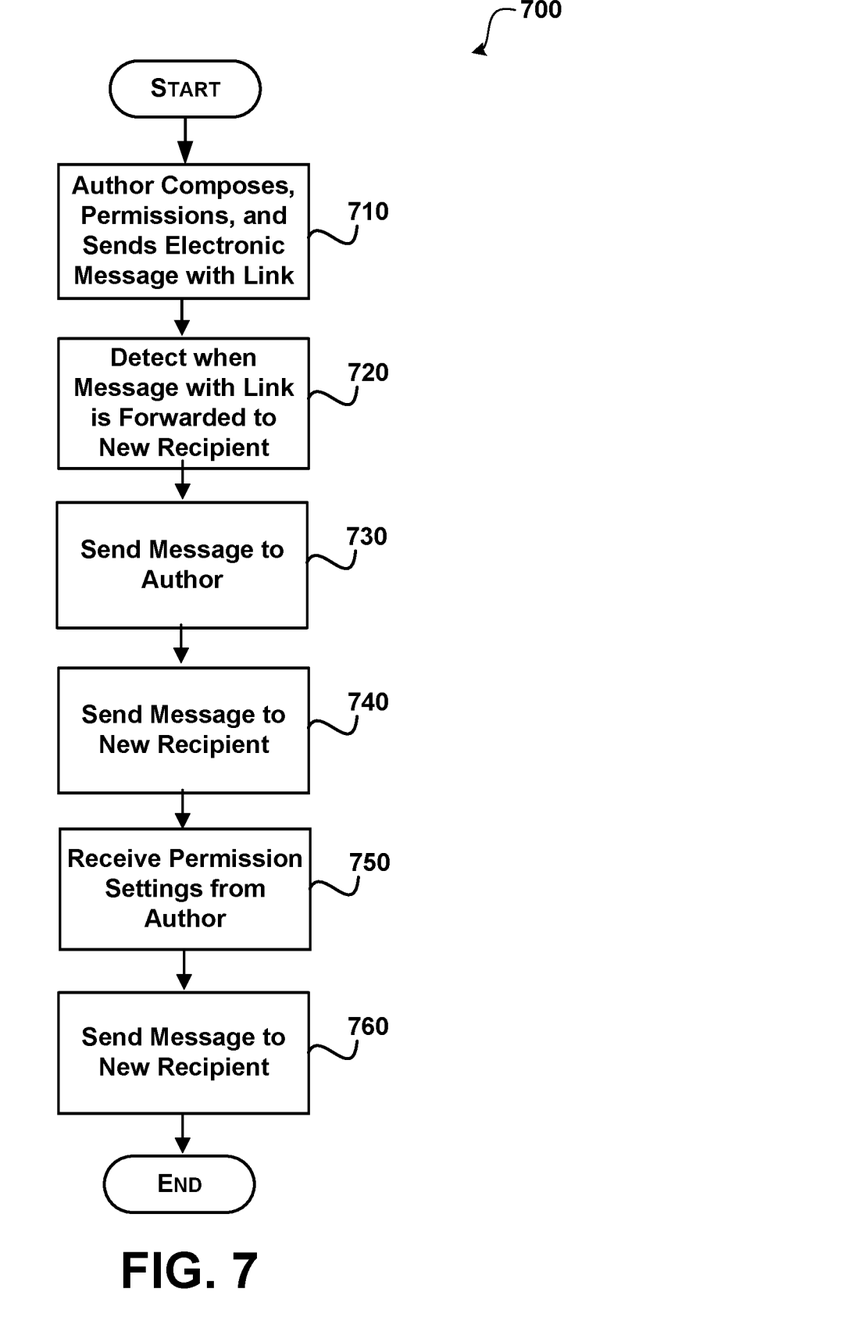
FIG. 7 shows an illustrative process for setting permissions for links that are forwarded in electronic messages.

FIG. 7 shows an illustrative process for setting permissions for links that are forwarded in electronic messages. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start block, process 700 moves to operation 710, where an author composes, permissions and sends an electronic message including a link. The electronic message may be any type of electronic message that includes a link. According to an embodiment, the electronic messages are email messages. Other messages may also include links, such as SMS, MMS, Instant Messages, social network messages, and the like. According to an embodiment, a default set of permissions (e.g. read/write) are automatically set for any links for each of the recipients that are included within an original message that is created by the author. The permissions for the links may also be individually configured and/or more users may be authorized to access the linked content that are not recipients of the original message.

Flowing to operation 720, any links that are forwarded in a message to a recipient are detected. For example, when a message is forwarded by a messaging system, the message may be automatically parsed to detect the links. The links may be contained anywhere within a thread of the electronic message (e.g. within a first reply to a message, a third reply and the original message).

Moving to operation 730, a notification message is sent to the author of the original message including the link that the link was forwarded to another recipient. The recipient may/may not be authorized to access the content. The determination of whether the recipient is authorized may be made by the messaging system. For example, the messaging system may access a network share to determine permissions for one or more recipients. According to an embodiment, the author sets the conditions on when to receive notifications for recipients receiving a forwarded message that are authorized to access the content. When one or more of the recipients is not authorized to access the linked content, the notification message includes permission options for setting permissions to the linked content for the recipients of the authorized message. For example, the author may permission the recipients as a group and/or individually (e.g. read/write, read, write, deny).

Transitioning to operation 740, a notification message is sent to a recipient of the forwarded message including the link that indicates that the author has been notified of the forwarding of the link and that the author has been requested to set the permission for the recipient to access the linked content.

Flowing to operation 750, permission settings are received from the author. According to an embodiment, the permission settings are set within a reply message. In this way, the settings may be made while the author is offline and when the author goes online again, the permission settings are sent within the reply message to the permission manager. When the author is online, the permission settings may be sent directly to the permission manager in response to selecting a permission option within the displayed permission options.

Moving to operation 760, a message is sent to a recipient of the forwarded message when the permissions for the recipient to access the linked content have been received from the author.

The process then flows to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    determining an electronic message that includes a link to content is forwarded by an original first recipient of the electronic message to a second recipient who is not an original recipient of the electronic message, wherein the second recipient is able to access the forwarded electronic message but is unauthorized to access the content associated with the link;
    in response to the determination, sending a request message to an author of the electronic message indicating the electronic message was forwarded to the second recipient and requesting that the author provide a permission setting for the second recipient to access the content associated with the link;
    responsive to the request message, receiving the permission setting for the second recipient, wherein a permission to access the content associated with the link is set according to the received permission setting; and
    sending a notification message to the second recipient including the forwarded electronic message and indicating the author has set the permission for the second recipient to access the content associated with the link in the forwarded electronic message.

2. The method of claim 1, wherein receiving the permission setting responsive to the request message comprises receiving a message from the author that includes the permission setting.

3. The method of claim 2, wherein the received message is a reply message to the request message.

4. The method of claim 1, wherein the notification message is a second notification message sent to the second recipient, and the method further comprises:
    in response to the determination, sending a first notification message to the second recipient including the forwarded electronic message and indicating the second recipient is currently unauthorized to access the content associated with the link and a request has been sent to the author to provide the permission setting for the second recipient to access the content associated with the link.

5. The method of claim 1, wherein the notification message further indicates a type of the permission set.

6. The method of claim 1, further comprising providing the electronic message and a selectable menu within a display of the request message sent to the author, the selectable menu comprising one or more options to set a permission to the content associated with the link included in the electronic message.

7. The method of claim 1, further comprising providing a selectable menu within a display of the electronic message before the electronic message is sent by the author, the selectable menu comprising one or more options to set a permission to the content associated with the link.

8. The method of claim 7, wherein the first recipient is one of a group of users and the one or more options to set the permission to the content associated with the link comprises an option to set a default permission for the group.

9. The method of claim 1, wherein the permission setting comprises one of read access, write access, read and write access, or deny access.

10. A system, comprising:
    one or more processors; and
    memory storing instructions, that when executed by the one or more processors, cause operations comprising:
        determining an electronic message that includes a link to content is forwarded by an original first recipient of the electronic message to a second recipient who is not an original recipient of the electronic message, wherein the second recipient is able to access the forwarded electronic message but is unauthorized to access the content associated with the link;
        sending a request message to an author of the electronic message indicating the electronic message was forwarded to the second recipient and requesting that the author provide a permission setting for the second recipient to access the content associated with the link;
        providing an interface to enable the author to set the permission setting for the second recipient;
        receiving the permission setting for the second recipient, wherein a permission to access the content associated with the link is set according to the received permission setting; and
        sending a notification message to the second recipient including the forwarded electronic message and indicating the author has set the permission for the second recipient to access the content associated with the link in the forwarded electronic message.

11. The system of claim 10, wherein the notification message is a second notification message sent to the second recipient, and the memory further stores instructions, that when executed by the one or more processors, cause operations comprising:
    in response to the forwarding of the electronic message, sending a first notification message to the second recipient including the forwarded electronic message and indicating the second recipient does not have access to the content associated with the link and a request has been sent to the author to set a permission to the content associated with the link for the second recipient.

12. The system of claim 10, wherein the notification message further indicates a type of the permission set.

13. The system of claim 10, wherein the interface comprises the electronic message and a selectable menu within a display of the request message sent to the author, the selectable menu comprising one or more options to set a permission to the content associated with the link included in the electronic message.

14. The system of claim 10, wherein the interface comprises a selectable menu within a display of the electronic message before the electronic message is sent by the author that provides one or more options for setting a permission to the content associated with the link.

15. The system of claim 10, wherein sending the request message to the author of the electronic message comprises automatically sending the request message to the author of the electronic message after detecting the first recipient forwarded the electronic message to the second recipient.

16. The system of claim 10, further comprising prior to sending the electronic message to the original first recipient, determining whether a permission setting for the original first recipient permits the original first recipient to forward the electronic message and whether each non-original recipient that the original first recipient forwards the electronic message to is automatically permitted to access the content associated with the link.

17. A method, comprising:
 determining an electronic message that contains a link to content sent by an author to an original first recipient is forwarded by the first recipient to a non-original second recipient and a non-original third recipient, wherein the second recipient and the third recipient are able to access the forwarded electronic message but are unauthorized to access the content associated with the link;
 in response to the determination, sending a first request message to the author indicating the electronic message was forwarded to the second recipient and the third recipient and requesting that the author provide permission settings for the second recipient and the third recipient to access the content associated with the link;
 responsive to the request message, receiving the permission settings for the second recipient and the third recipient from the author, wherein:
  the permission setting for the second recipient differs from the permission setting for the third recipient,
  a permission for the second recipient to access the content associated with the link is set according to the permission setting received from the author for the second recipient, and
  a permission for the third recipient to access the content associated with the link is set according to the permission setting received from the author for the third recipient; and
 sending a notification message to the second recipient and the third recipient including the forwarded electronic message and respectively indicating the author has set the permission for the second recipient and the third recipient to access the content associated with the link in the forwarded electronic message.

18. The method of claim 17, wherein each permission setting comprises read access, write access, read and write access, or deny access.

19. The method of claim 18, wherein:
 the permission setting received from the author for the second recipient comprises deny access to the content associated with the link and the notification message sent to the second recipient further indicates the author has denied access to the content associated with the link; and
 the permission setting received from the author for the third recipient comprises read access to the content associated with the link and the notification message sent to the third recipient further indicates the author has provided read access to the content associated with the link.

20. The method of claim 17, wherein the notification message is a second notification message sent to the second recipient and the third recipient, and the method further comprises:
 in response to the forwarding of the electronic message to the second recipient, sending a first notification message to the second recipient including the forwarded electronic message and indicating the second recipient does not have access to the content associated with the link; and
 in response to the forwarding of the electronic message to the third recipient, sending a first notification message to the third recipient including the forwarded electronic message and indicating the third recipient does not have access to the content associated with the link.

* * * * *